(12) United States Patent
DeWind et al.

(10) Patent No.: US 10,035,658 B2
(45) Date of Patent: Jul. 31, 2018

(54) ADJUSTABLE AUGER ASSEMBLY FOR A TRENCHER

(71) Applicant: DeWind One-Pass Trenching, LLC, Zeeland, MI (US)

(72) Inventors: Gregory Allen DeWind, Zeeland, MI (US); Ryan DeWind, Zeeland, MI (US)

(73) Assignee: DeWind One-Pass Trenching LLC, Zeeland, MI (US)

(*) Notice: Subject to any disclaimer, the term of this patent is extended or adjusted under 35 U.S.C. 154(b) by 0 days.

(21) Appl. No.: 15/649,847

(22) Filed: Jul. 14, 2017

(65) Prior Publication Data

US 2017/0349379 A1    Dec. 7, 2017

Related U.S. Application Data

(63) Continuation of application No. 15/172,564, filed on Jun. 3, 2016, now Pat. No. 9,708,129.

(51) Int. Cl.
| | |
|---|---|
| *B65G 33/14* | (2006.01) |
| *B65G 41/00* | (2006.01) |
| *B65G 37/00* | (2006.01) |
| *E02D 29/02* | (2006.01) |

(52) U.S. Cl.
CPC ............. *B65G 33/14* (2013.01); *B65G 37/00* (2013.01); *B65G 41/003* (2013.01); *E02D 29/0283* (2013.01)

(58) Field of Classification Search
CPC ........ B65G 21/10; B65G 21/12; B65G 21/14; B65G 41/001; B65G 41/003; B65G 33/14; B65G 37/00; B65G 33/22; E20D 29/0283
See application file for complete search history.

(56) References Cited

U.S. PATENT DOCUMENTS

| | | | | |
|---|---|---|---|---|
| 3,896,570 A | * | 7/1975 | McMurray | E02F 3/06 37/189 |
| 4,218,169 A | * | 8/1980 | Arends | B60P 1/40 414/523 |
| 4,387,857 A | * | 6/1983 | Young | B65G 41/002 241/101.74 |
| 4,443,149 A | * | 4/1984 | Isaacson | A01C 15/003 198/507 |
| 4,697,648 A | * | 10/1987 | Brandt | E21B 17/07 173/162.1 |
| 4,742,938 A | * | 5/1988 | Niewold | B65G 21/12 198/315 |

(Continued)

*Primary Examiner* — Mark A Deuble
(74) *Attorney, Agent, or Firm* — The Watson IP Group, PLC; Jovan N. Jovanovic; Vladan M. Vasiljevic

(57) ABSTRACT

An adjustable auger assembly for a trencher including an auger housing and a position attachment assembly. The auger housing having a central auger tube having a first end and a discharge end opposite the first end. An auger shaft is positioned within the auger tube and is rotatable relative to the central auger tube. At least one material inlet is positioned one of at the first end and between the first end and the discharge end. The position attachment assembly has a first component member coupled to the trencher, and a second component member coupled to the auger housing. The first component member is movably positionable relative to the second component member, to, in turn, adjust the position of the auger housing relative to the trencher.

14 Claims, 14 Drawing Sheets

(56) References Cited

U.S. PATENT DOCUMENTS

| | | | | |
|---|---|---|---|---|
| 8,381,900 B1* | 2/2013 | Hoogestraat | ............ | B65G 33/14 |
| | | | | 198/588 |
| 2001/0032741 A1* | 10/2001 | Sherwood | ................. | E02D 5/34 |
| | | | | 175/162 |
| 2004/0031617 A1* | 2/2004 | Skarlupka, IV | ........ | E21B 7/028 |
| | | | | 173/184 |
| 2009/0114504 A1* | 5/2009 | Bauman | ................. | B65G 33/00 |
| | | | | 198/316.1 |
| 2010/0108470 A1* | 5/2010 | Grose | .................... | B65G 47/18 |
| | | | | 198/671 |
| 2010/0300845 A1* | 12/2010 | Rayhons | ................ | B65G 33/24 |
| | | | | 198/660 |
| 2012/0145517 A1* | 6/2012 | Zazula | ................... | B65G 33/32 |
| | | | | 198/582 |

* cited by examiner

ADJUSTABLE AUGER ASSEMBLY FOR A TRENCHER

CROSS-REFERENCE TO RELATED APPLICATION

This application is a continuation of U.S. patent application Ser. No. 15/172,564, filed on Jun. 3, 2016 entitled ADJUSTABLE AUGER ASSEMBLY FOR A TRENCHER, the entire disclosure of which is hereby incorporated by reference.

BACKGROUND OF THE DISCLOSURE

1. Field of the Disclosure

The disclosure relates in general to trenching equipment, and more particularly, to an adjustable auger assembly for a trencher.

2. Background Art

The use of trenching equipment is known in the art. Trenching equipment can be utilized to, for example, form an underground wall which is a non-structural wall that can form a barrier to the movement of the groundwater thereacross. Typically, the existing soil is mixed with an outside material (usually a clay-like material such as bentonite, and/or cement) and then reintroduced into the trench. The outside material when mixed with existing soil forms a wall which provides for a barrier to the passage of groundwater. Of course, we are not limited to such materials.

Among other considerations, it is very important to supply the proper amount of outside material at the proper flow rate into the trencher so that the desired substantially homogenous mixture of existing soil and outside material can be achieved. Problems can result from either too much outside material being added, or not enough outside material being added. It is therefore necessary to control the application of the outside material to the trencher.

It is an object of the present disclosure to provide an improved delivery of outside material to the trencher during operation thereof.

SUMMARY OF THE DISCLOSURE

The disclosure is directed to an adjustable auger assembly for a trencher including an auger housing and a position attachment assembly. The auger housing having a central auger tube having a first end and a discharge end opposite the first end. An auger shaft is positioned within the auger tube and is rotatable relative to the central auger tube. At least one material inlet is positioned one of at the first end and between the first end and the discharge end. The position attachment assembly has a first component member coupled to the trencher, and a second component member coupled to the auger housing. The first component member is movably positionable relative to the second component member, to, in turn, adjust the position of the auger housing relative to the trencher.

In some configurations, the first component member and the second component member are slidably positionable relative to each other, to, in turn, adjust the position of the auger housing relative to the trencher.

In some configurations, the position that is adjustable is a vertical position of the auger housing relative to the trencher.

In some configurations, the first component member comprises a saddle member. The saddle member has opposing side walls defining a channel. The second component comprises a beam member having a central body slidably positionable within the saddle member.

In some configurations, at least one side wall includes a structure, with the beam member having a corresponding structure, to provide alignment during slidable engagement.

In some configurations, the at least one side wall includes a plurality of guide pins. The beam member has a corresponding protrusion to slidably interface with the guide pins, so as to provide alignment during slidable engagement therebetween.

In some configurations, each side wall includes a plurality of guide pins. The beam member having a corresponding protrusion on either side thereof to slidably interface with the guide pins, so as to provide alignment during slidable engagement therebetween.

In some configurations, the position adjustment assembly further includes an adjustment member configured to slidably urge or maintain the second component member in a desired position relative to the first component member.

In some configurations, the adjustment member comprises a winch member mounted on one of the second component member and the first component member and a cable that is coupled to the winch at one end and fixedly coupled to the other of the second component member and the first component member, or a structure fixedly coupled thereto.

In some configurations, the winch is mounted on the first component member and the cable includes a second end coupled to the auger frame.

In some configurations, the winch comprises a dual winch member, having a first cable member and a second cable member. The second end of both of the first cable member and the second cable member are coupled to the second component member on either side of the winch.

In some configurations, the adjustable auger assembly further comprises a material feed assembly having a discharge end that is coupled to the material inlet.

In some configurations, the material feed assembly further comprises a first hopper having a storage container, a hopper auger tube coupled to the first hopper at the bottom end thereof, and a hopper auger shaft augmented by an auger motor. The hopper auger shaft is positioned within the hopper auger tube, to, in turn, direct material through the discharge end and, in turn, into the material inlet.

In some configurations, the material feed assembly further comprises a second hopper positioned opposite the first hopper. The second hopper has a storage container, a hopper auger tube coupled to the first hopper at the bottom end thereof, and a hopper auger shaft augmented by an auger motor. The hopper auger shaft is positioned within the hopper auger tube, to, in turn, direct material through the discharge end and, in turn, into the material inlet.

BRIEF DESCRIPTION OF THE DRAWINGS

The disclosure will now be described with reference to the drawings wherein.

DETAILED DESCRIPTION OF THE DISCLOSURE

Figure 1:
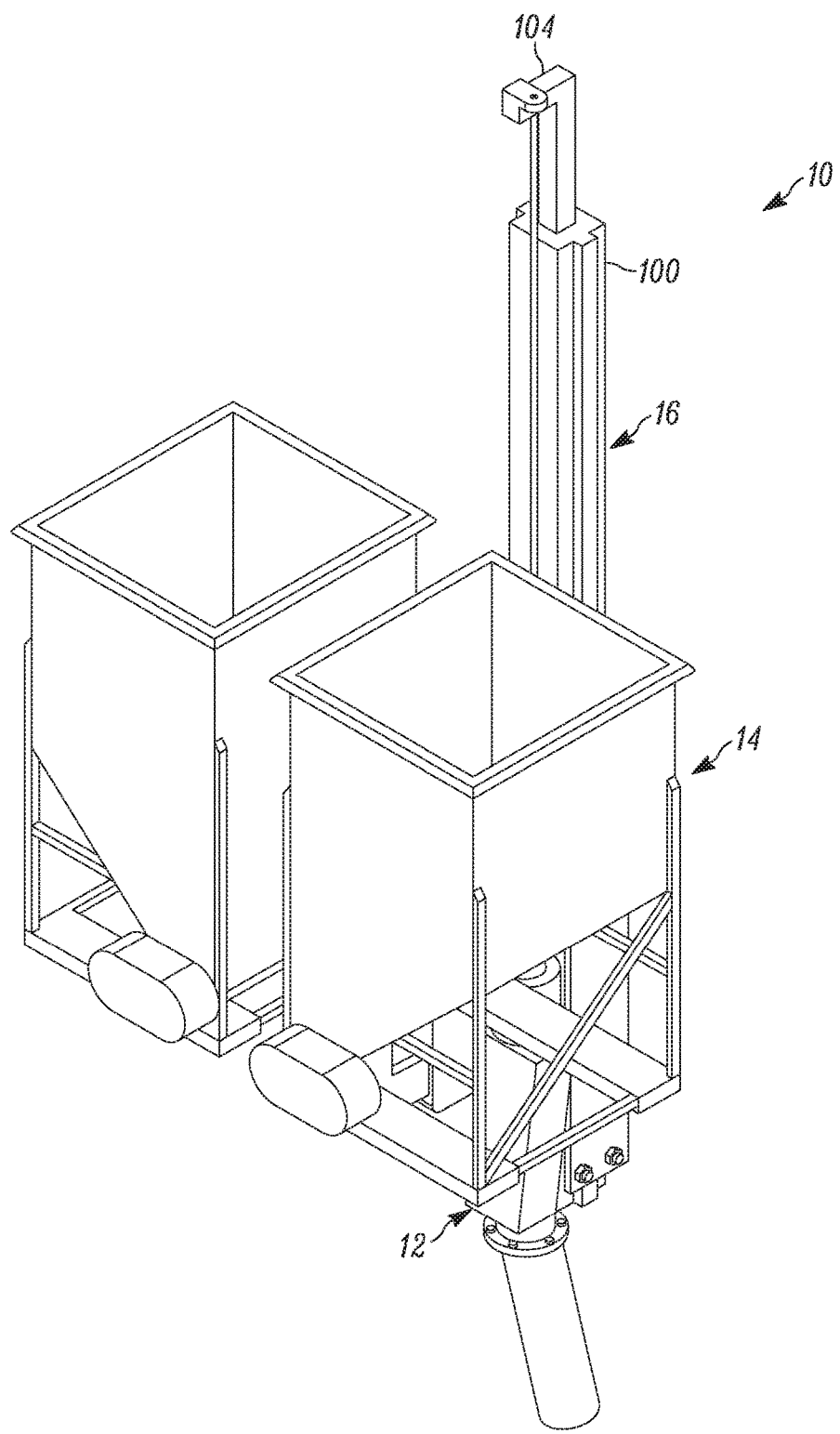
FIG. 1 of the drawings is a front perspective view of the adjustable auger assembly of the present disclosure.
Figure 2:
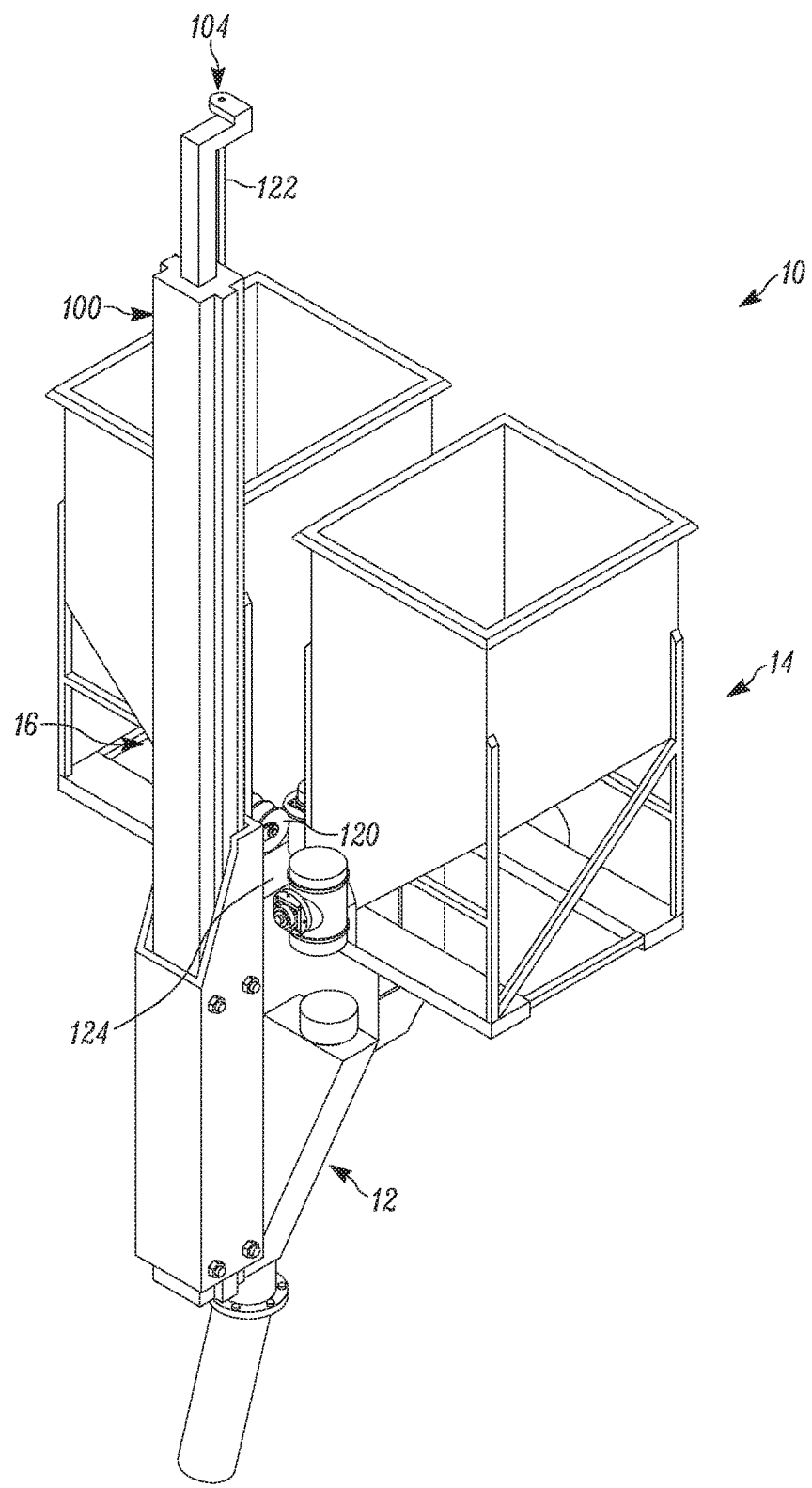
FIG. 2 of the drawings is a back perspective view of the adjustable auger assembly of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the adjustable auger assembly for a trencher is shown generally at 10. The adjustable auger assembly is positionable and attachable to a trencher, generally in front of the trencher, as is shown in FIG. 1. The trencher is of the type that includes a long boom having a rotating set of teeth that can rotate about the boom. The boom can be driven into the ground and pulled backwards tilling/trenching the soil along the path of the trencher. The adjustable auger assembly is attachable to generally the front of the long boom when the boom is in the substantially vertical orientation, such that when pulled, the auger is positioned to follow the movement of the boom as the trencher proceeds.

The adjustable auger assembly includes auger housing 12, material feed assembly 14, and position adjustment assembly 16. The auger housing 12 includes first side 26, second side 27, inner end 28 and outer end 29. It will be understood that the when positioned, the inner end 28 of the auger housing is adjacent the boom of the trencher, with the outer end being spaced apart therefrom. The auger housing provides a member onto which the material feed assembly and the position adjustment assembly may be anchored.

The auger housing further includes a central auger tube 20, auger shaft 22 and auger motor 24. The central auger tube 20 includes first end 30, discharge end 32 and material inlet 34. In the configuration shown, when in an operating configuration, the central auger tube is inwardly angled relative to the boom so that the material that extends out of the discharge end 32 can, at least partially, be directed inwardly at the boom, in addition to the generally downward direction. The central auger tube is generally substantially cylindrical.

The material inlet 34 provides material inlet into the auger. In the configuration shown, the material inlet 34 includes first side inlet 36 and second side inlet 38. The first and second side inlets are on opposite sides of each other and are angled in a generally downward direction when the boom is in the operating configuration. In such a configuration, the force of gravity assists with directing the material through the material inlet and into the central auger tube. It will be understood that in other configurations, the material inlet may comprise a single material inlet, as opposed to two separate inlets that are positioned on opposing sides of the auger housing. It will be understood that where a single material inlet is provided, the material inlet may be positioned on one side of the auger housing, or may have a more central location. It will further be understood that additional material inlets may be positioned along the central auger tube. In various configurations, different materials, or the same materials may be directed through each of the material inlets. Furthermore, it will be understood that additional material inlets may be provided in the event that fluids, such as water and the like are separately provided into the central auger tube. In the configuration shown, the material inlet 34 is configured to receive either dry or wet material for passage into the central auger tube.

Positioned within the central auger tube is the auger shaft 22 which includes upper auger portion 40 (positioned above the material inlet) and lower auger portion 42, as well as motor coupling 44 positioned at the first end of the central auger tube. Motor 24 is positioned at the first end of the central auger tube and includes a shaft that is rotatably coupled to the motor coupling. That is, when the motor rotates, the auger shaft likewise rotates. It will be understood that as the shaft rotates, material that is introduced into the central auger tube by way of the material inlet, is directed by the auger shaft to the discharge end 32. It will be understood that the upper auger portion provides protection against damage to the motor, by preventing material from reaching the first end 30 of the central auger tube in the event that the central auger tube becomes clogged or the like.

The material feed assembly 14 is shown as comprising first hopper 50 and second hopper 250. It will be understood that in the configuration shown, the first and second hoppers 50, 250 are substantial mirror images of each other. As such, the first hopper will be described in greater detail with the understanding that the second hopper is substantially identical thereto. It will further be understood that in other configurations, the first hopper and the second hopper may be different, that only a single hopper may be present, or that material may be fed into the material inlet 34 through remotely positioned structures.

In the configuration shown, the first hopper 50 comprises storage container 52, hopper auger tube 54 and hopper auger shaft 56. The first hopper 50 is coupled to the auger housing 12 about the first side thereof, so that the discharge end is proximate to the first side inlet 36 of the material inlet 34. The first hopper includes the storage container 52 which is configured hold a predetermined amount of material. In the configuration shown, the storage container includes top opening 60, sidewalls 61 and bottom end 62. The storage container includes inclined surfaces so that the bottom end 62 directs material to the hopper auger tube 54 with the aid of gravity. Indeed, the particular dimensions and the like for the storage container are not to be deemed limiting, but are to be exemplary.

The hopper auger tube 54 includes first end 63 and discharge end 64. In the configuration shown, the hopper auger tube extends from the outer end toward the inner end of the auger housing, with the discharge end being positioned proximate the first side inlet 36 of the material inlet 34.

The hopper auger shaft 56 extends within the hopper auger tube and directs material that is in the storage container of the hopper toward the discharge end 64. The hopper auger shaft 56 is coupled to auger motor 65 which is positioned proximate the outer end of the auger housing, proximate the first end of the hopper auger tube 54.

Similarly, the second hopper 250 comprises storage container 252, hopper auger tube 254 and hopper auger shaft 256. The second hopper 250 is coupled to the auger housing 12 about the second side thereof, so that the discharge end is proximate to the second side inlet 38 of the material inlet 34. The second hopper includes the storage container 252 which is configured hold a predetermined amount of material. In the configuration shown, the storage container includes top opening 260, sidewalls 261 and bottom end 262. The storage container includes inclined surfaces so that the bottom end 262 directs material to the hopper auger tube 254 with the aid of gravity. Indeed, the particular dimensions and the like for the storage container are not to be deemed limiting, but are to be exemplary.

The hopper auger tube 254 includes first end 263 and discharge end 264. In the configuration shown, the hopper auger tube extends from the outer end toward the inner end of the auger housing, with the discharge end being positioned proximate the second side inlet 38 of the material inlet 34.

The hopper auger shaft 256 extends within the hopper auger tube and directs material that is in the storage container of the hopper toward the discharge end 264. The hopper auger shaft 256 is coupled to auger motor 265 which is positioned proximate the outer end of the auger housing, proximate the first end of the hopper auger tube 254.

The position adjustment assembly 16 is configured to adjust the position of the adjustable auger assembly relative to the boom of the trencher. Generally, when in the operating position, the boom is substantially vertical. Thus, the position adjustment assembly 16 is typically configured to adjust for the vertical position of the auger assembly relative to the boom.

The position adjustment assembly includes a slidable coupling assembly 70. The vertical adjustment and relative movement of the auger can be accomplished through other couplings, however, the slidable coupling assembly includes first component member 72, second component member 74 and adjustment member 76.

The first component member 72 includes saddle member 80 which is preferably coupled to the boom of the trencher.

Figure 3:
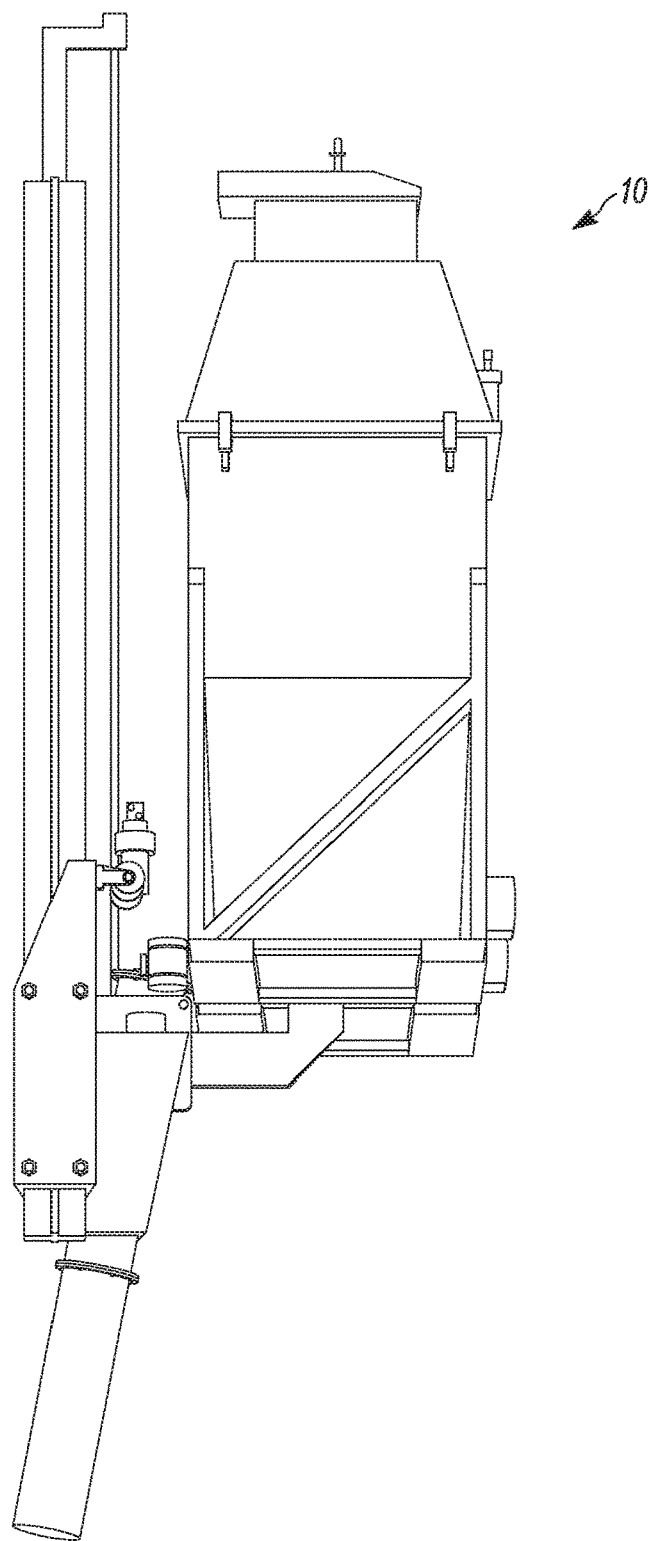
FIG. 3 of the drawing is a side elevational view of the adjustable auger assembly of the present disclosure, showing, in particular, attachment to a boom of a trencher, with the blade removed.
Figure 4:
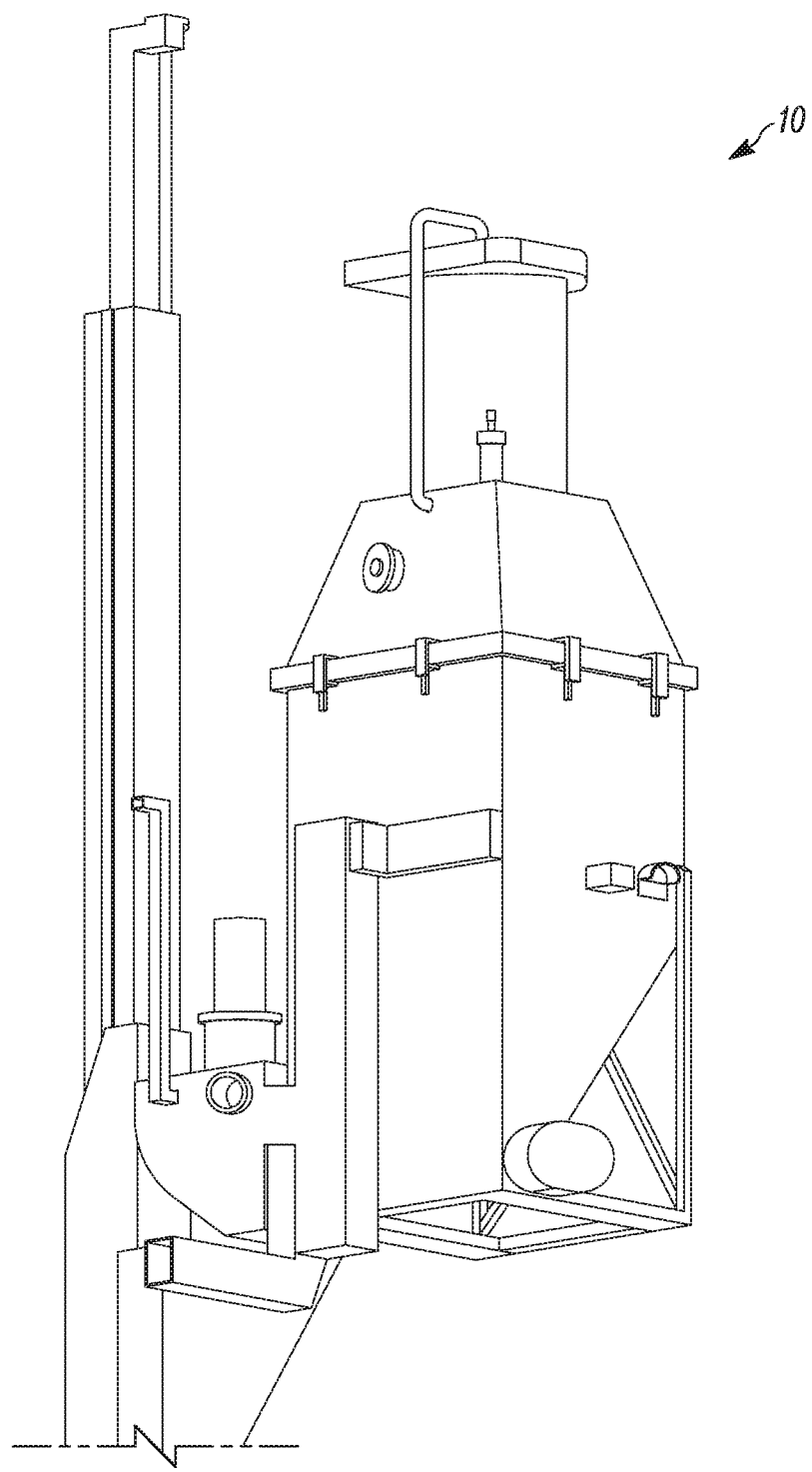
FIG. 4 of the drawings is a perspective view of the adjustable auger assembly of the present disclosure, showing, in particular, the attachment to a boom of a trencher, in the operating environment.
Figure 5:
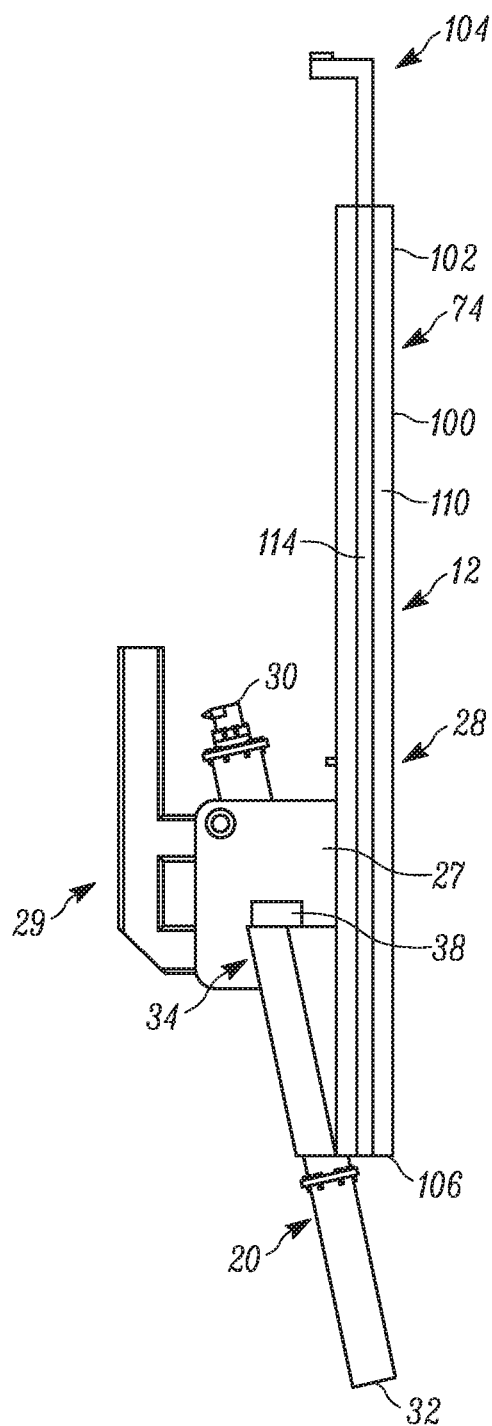
FIG. 5 of the drawings is a first side elevational view of the auger housing of the adjustable auger assembly of the present disclosure.
Figure 6:
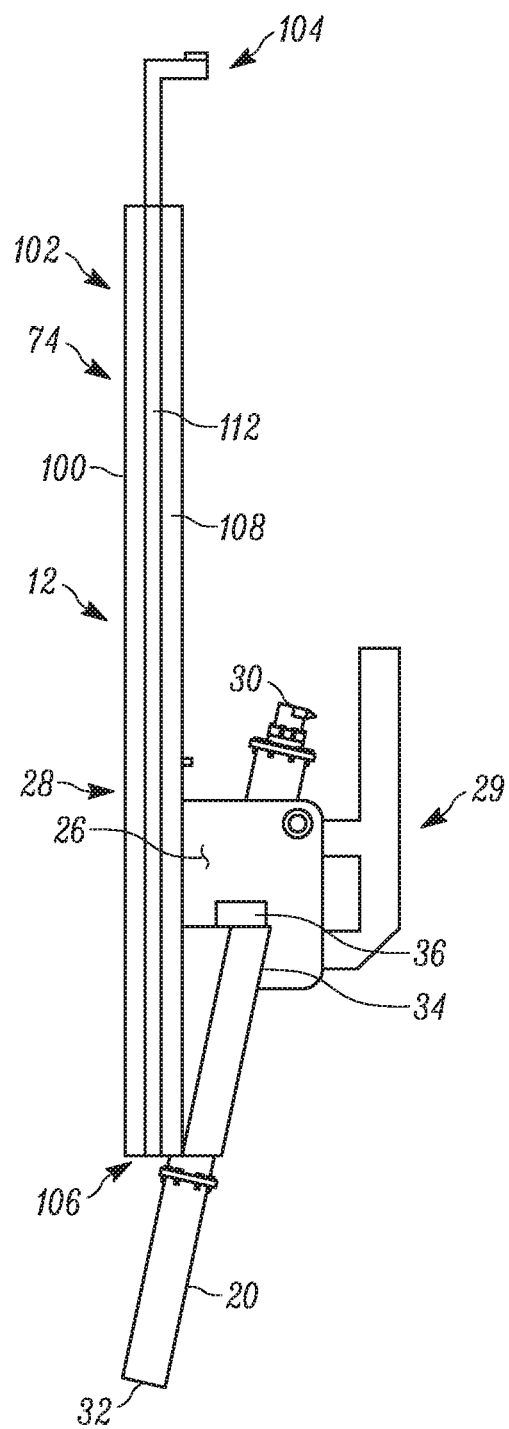
FIG. 6 of the drawings is a second side elevational view of the auger housing of the adjustable auger assembly of the present disclosure.
Figure 7:
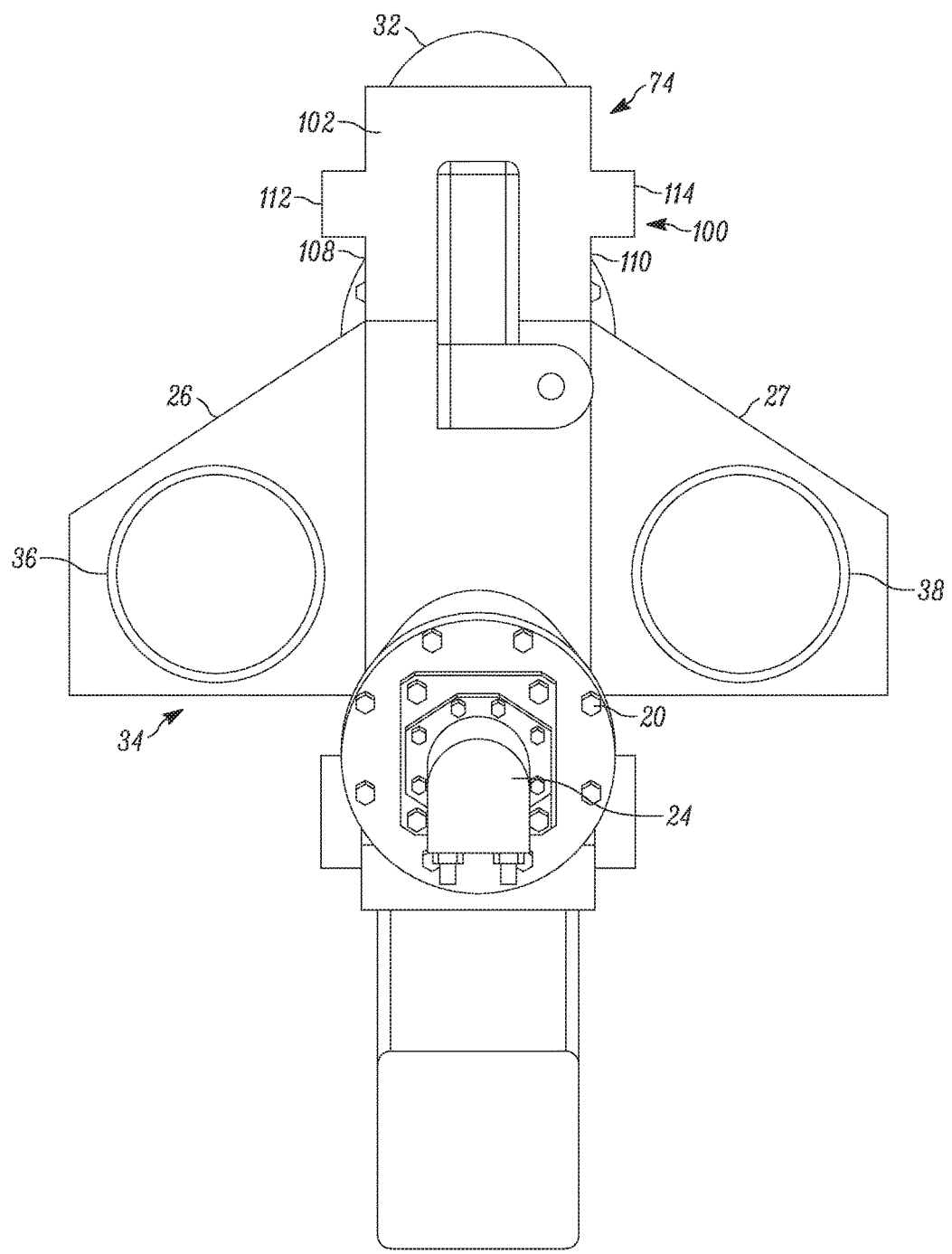
FIG. 7 of the drawings is a top plan view of the auger housing of the adjustable auger assembly of the present disclosure.
Figure 8:
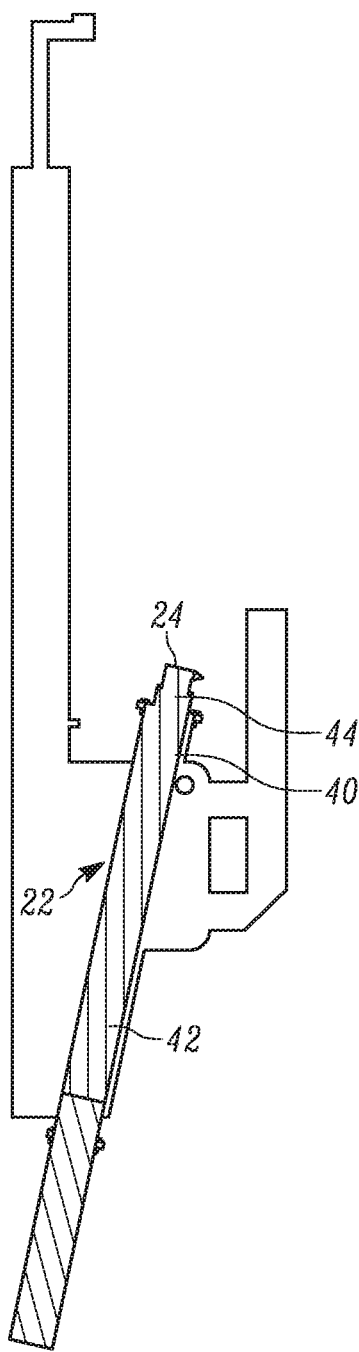
FIG. 8 of the drawings is a partial cross-sectional view of the auger housing of the adjustable auger assembly of the present disclosure, showing, in particular, the auger shaft positioned therein.

In the configuration shown in FIG. 3 a pair of hooks on either side of the saddle member interface with a hydraulic cylinder to be in a clamped retained configuration. Of course, other configurations are contemplated such nut and bolt fasteners. In other configurations, the saddle may be welded or otherwise coupled to the boom of the trencher.

The saddle member 80 includes base 82 with first side wall 84 to one side thereof and second side wall 86 to the other side. The side walls in the configuration shown are generally parallel to each other and generally perpendicular to the base 82. The base and the side walls cooperate to define channel 88 therebetween. The channel has a generally rectangular or square configuration. It will be understood that when mounted, the base is adjacent the boom with the first and second side walls extending away from the base.

A plurality of guide pins (or other protrusions), such as guide pins 89 extend inwardly from the first and second side walls. As will be explained, features of the beam member interface with the guide pins to maintain the beam member slidably movable within the saddle member. The guide pins 89 include first side inner guide pins 90, first side outer guide pins 91, second side inner guide pins 92 and second side outer guide pins 93. Each set of guide pins are spaced apart vertically and the guide pins are spaced apart between the inner and outer ones thereof. As such a channel is defined between the pair or inner and the pair of outer guide pins on either side of the channel. The guide pins may include bearings or surfaces which promote low friction, so as to allow the slidable movement of the beam member relative to the saddle member. Of course, the guide pins may form a protrusion or a depression, which engages with a mating structure on the other component member.

The second component member 74 in the configuration shown comprises beam member 100. The beam member includes an elongated central body 102. The central body has first end 104, second end 106, first side 108, and second side 110. The shape of the beam member substantially matches the shape of the saddle member such that the beam member is slidably positionable along the saddle member. In such a configuration, the first side slidably moves facing the first side wall of the saddle member and the second side slidably moves facing the second side wall of the saddle member.

The first side of the beam member includes a first side protrusion 112 that extends along the length of the beam member at least partially between the first and second ends thereof. The first side protrusion is configured to abuttingly engage the first side inner and first side outer guide pins, in slidable engagement. The protrusion member defines a channel within which the protrusion member is captured.

Similarly, the second side of the beam member includes a second side protrusion 114 that extends along the length of the beam member at least partially between the first and second ends thereof. The second side protrusion is configured to abuttingly engage the second side inner and the second side outer guide pins, in slidable engagement. The protrusion member defines a channel within which the protrusion member is captured.

As will be understood, when positioned within the saddle, the beam member slidably moves within the saddle, with the first side protrusion captured between the inner and outer guide pins of the first side. Similarly, the second side protrusion is captured between the inner and outer guide pins of the second side. Thus, while slidable movement is facilitated and guided, transverse movement between the saddle and the beam member is substantially precluded.

Figure 9:
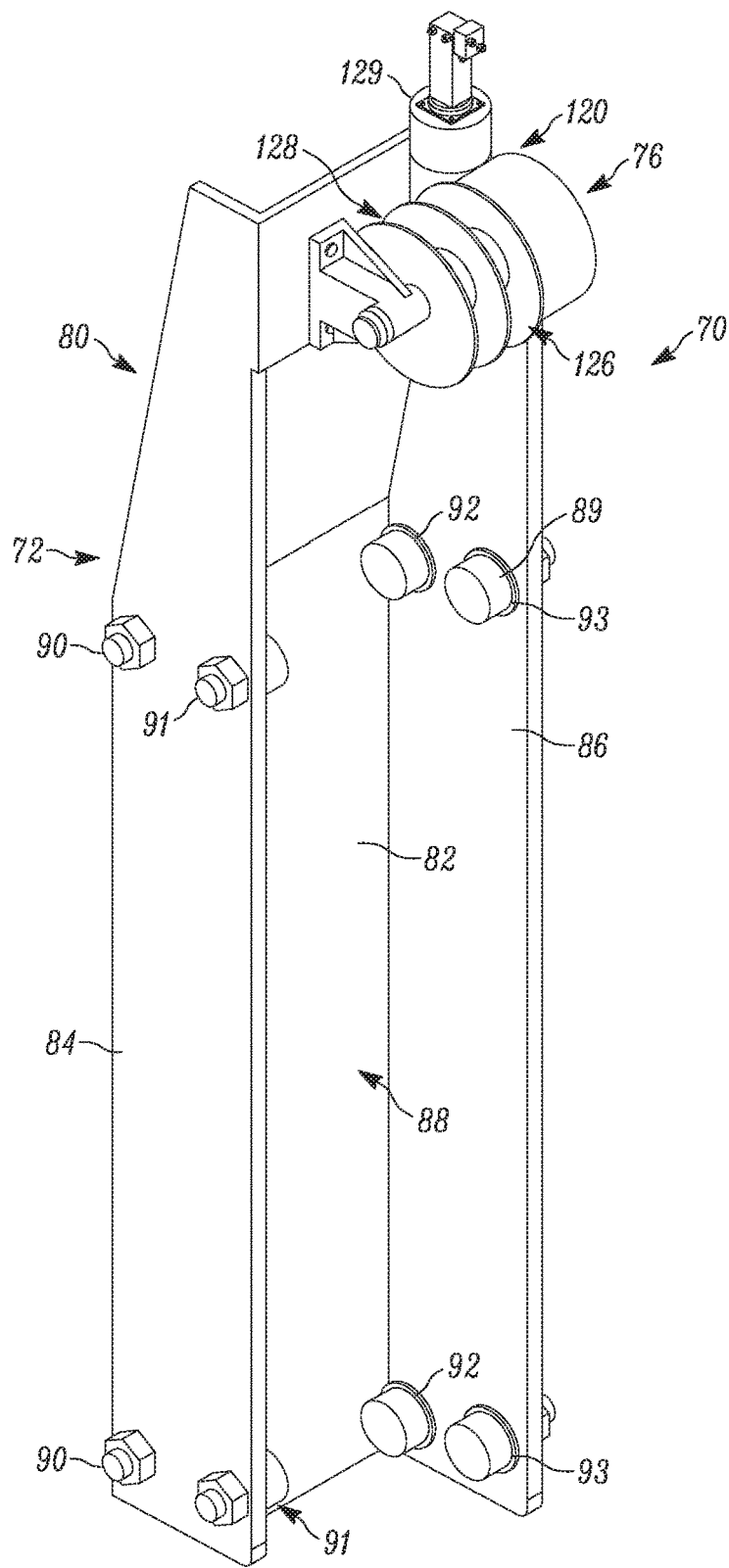
FIG. 9 of the drawings is a first side perspective view of the saddle member comprising the first component member of the slidable coupling assembly.
Figure 10:
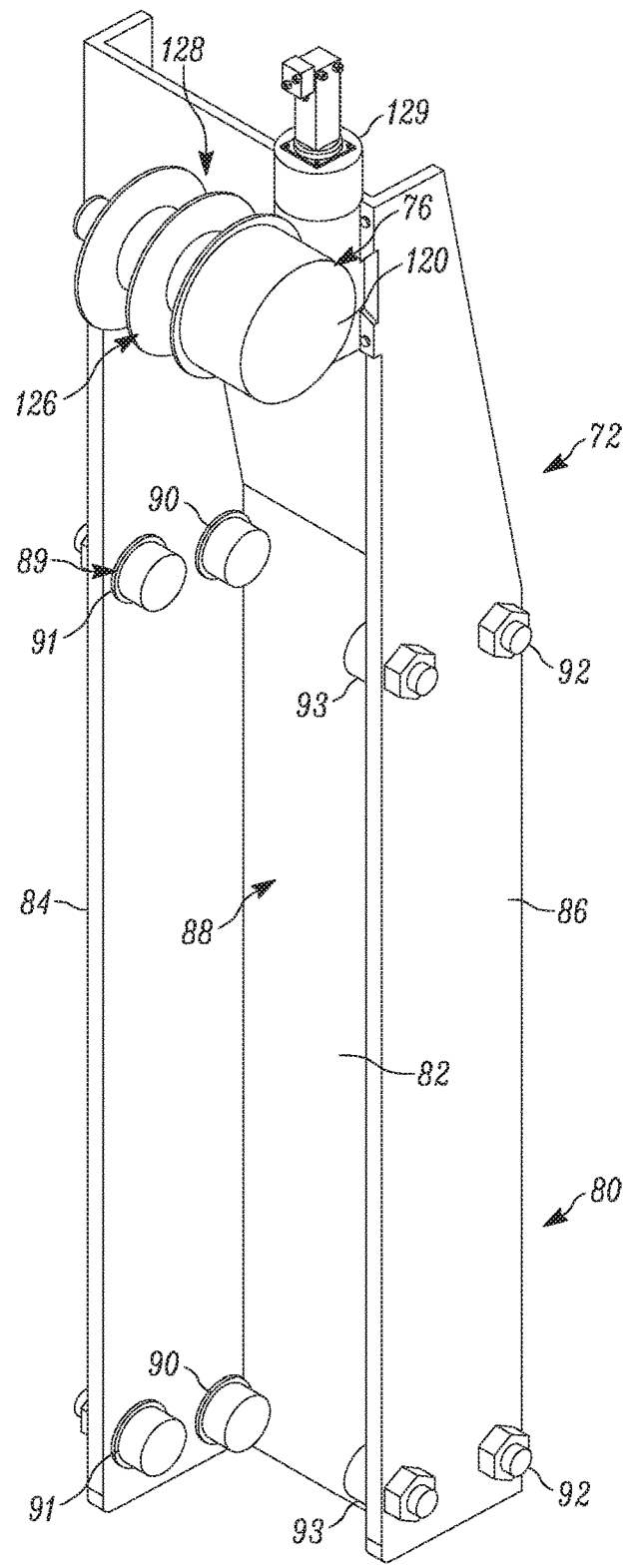
FIG. 10 of the drawings is a second side perspective view of the saddle member comprising the second component member of the slidable coupling assembly.
Figure 11:
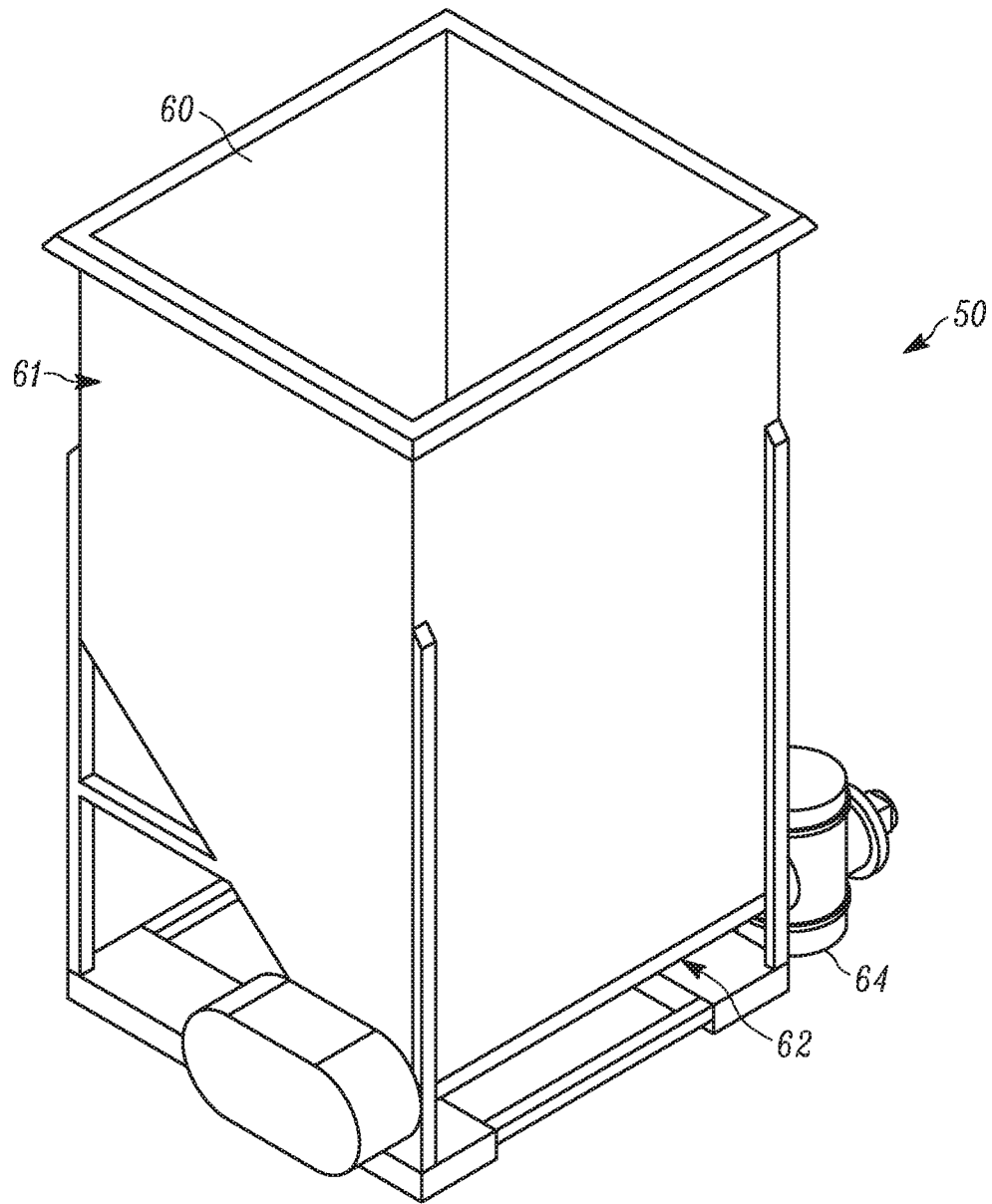
FIG. 11 of the drawings is a perspective view of the first hopper of the material feed assembly.
Figure 12:
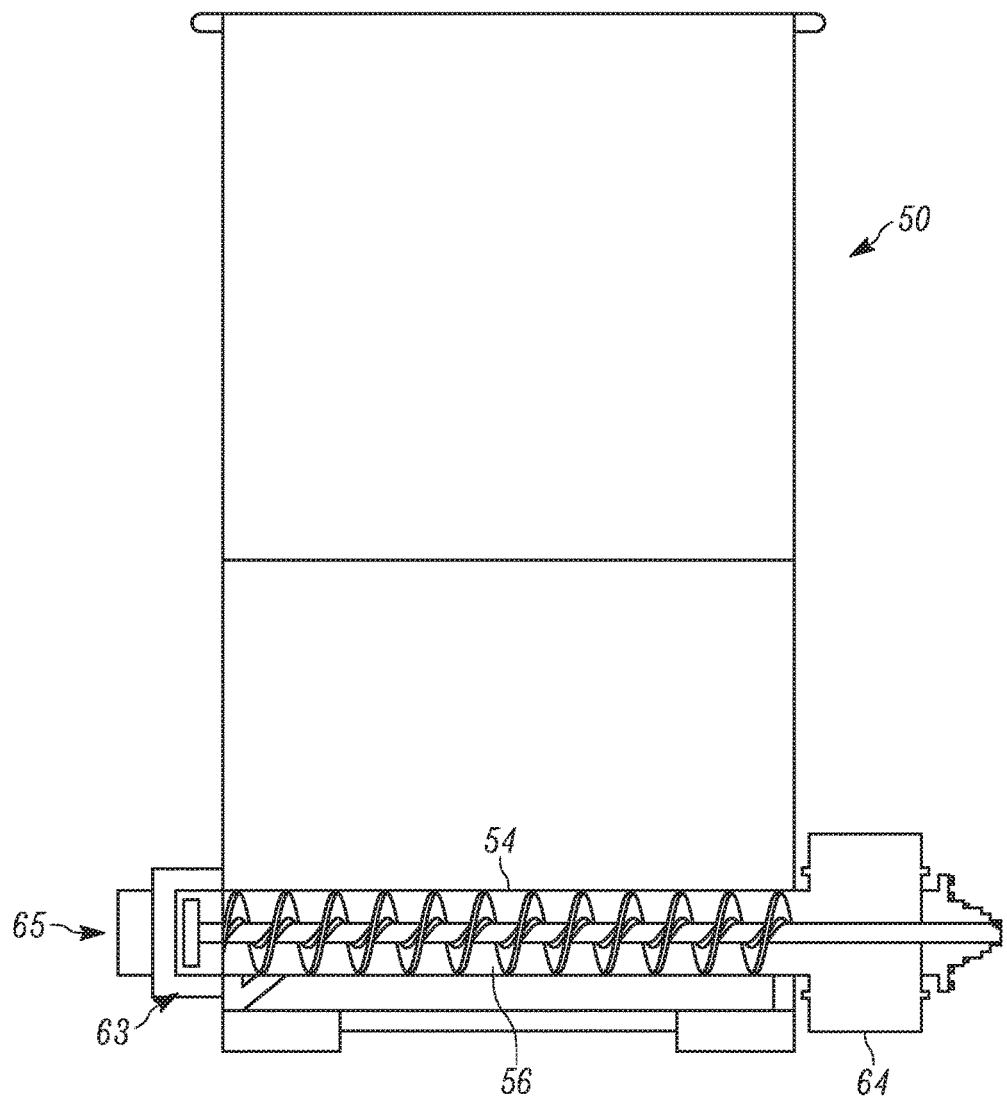
FIG. 12 of the drawings is a cross-sectional view of the first hopper of the material feed assembly.
Figure 13:
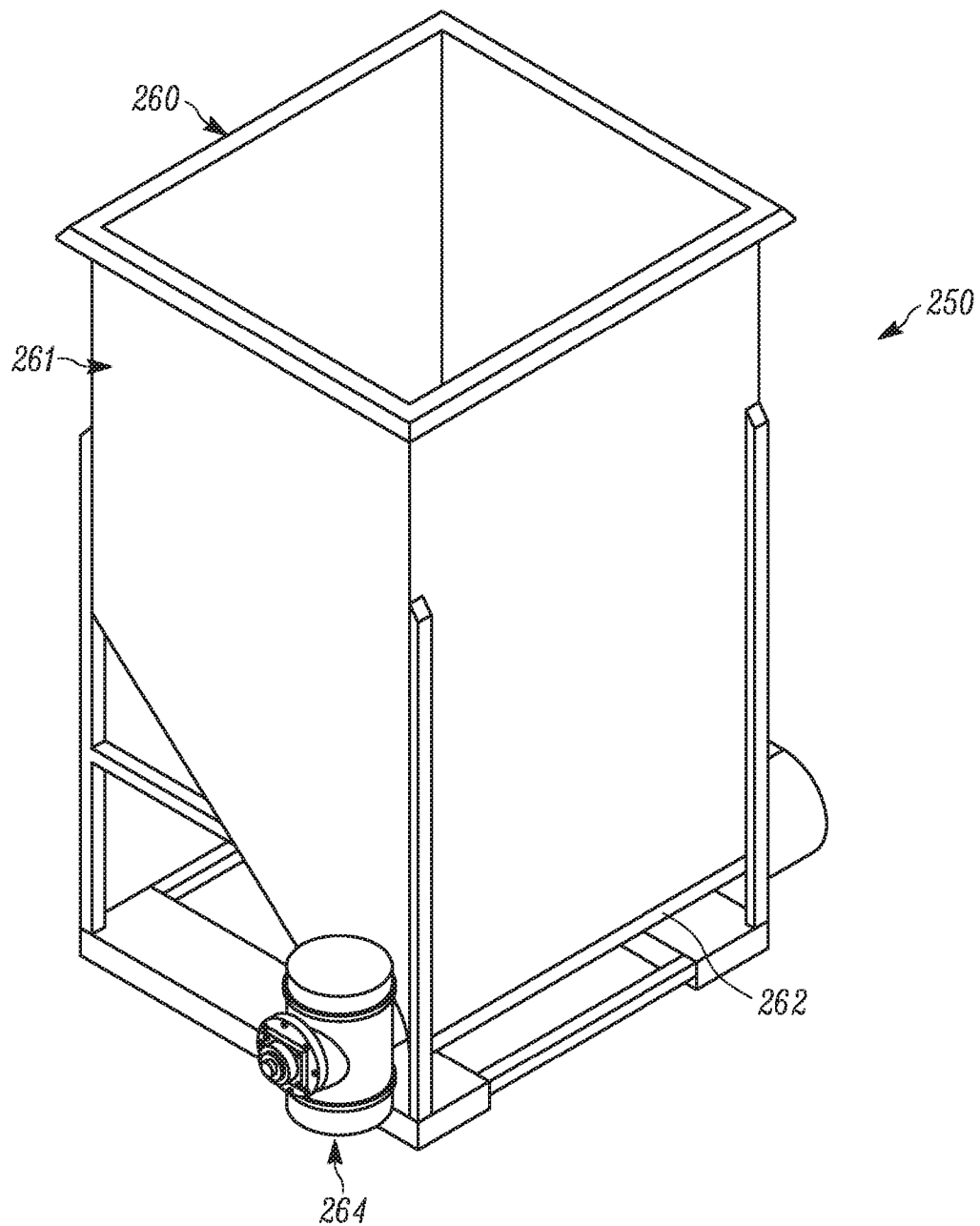
FIG. 13 of the drawings is a perspective view of the second hopper of the material feed assembly.
Figure 14:
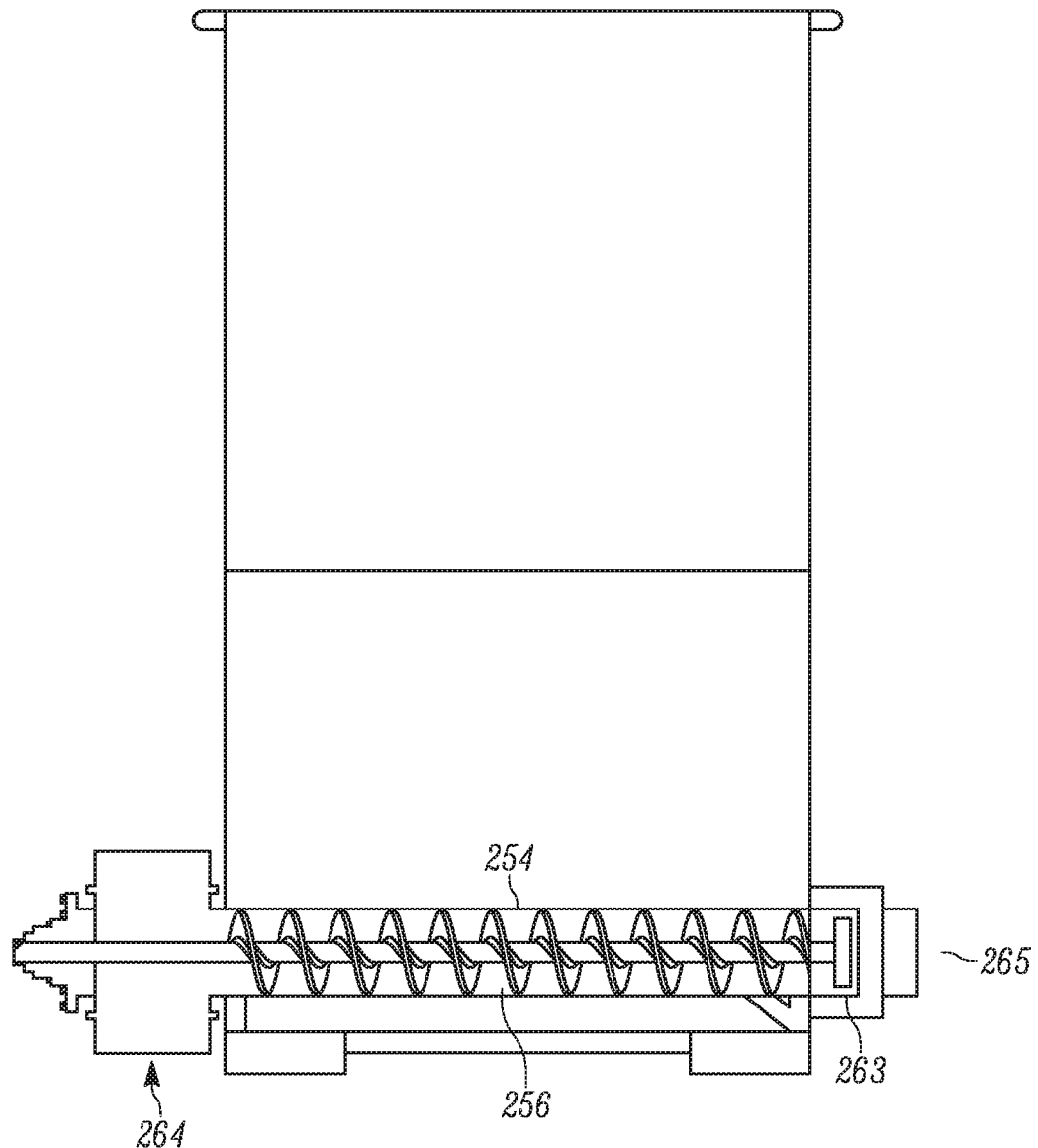
FIG. 14 of the drawings is a perspective view of the second hopper of the material feed assembly.

The adjustment member 76 is shown in FIG. 9 as comprising a double winch member 120. The double winch member includes a first roller 126 and a second roller 127 mounted on the same axle. The motor 129 is coupled thereto so as to facilitate rotation of the first and second rollers. The first cable 122 extends around the first roller 126 and is coupled at a second end to the first end of the beam member. In the configuration shown, an extension rod member is positioned proximate the first end of the beam member and an opening is provided through which the cable can be fastened. The second cable 124 is coupled to the second roller 127 at one end and to the auger housing 12 positioned below the double winch member 120. It will be explained that as the winch is rotated in a first direction, one of the first and second cables elongates, while the second of the cables shortens. Depending on the direction of rotation of the winch, the resulting rotation either moves the beam member upwardly or downwardly relative to the saddle member.

In operation, the adjustable auger assembly 10 is coupled to the boom of a trencher. In particular, the saddle member is mounted onto the boom, and various structures, such as those described above are utilized to releasably, or permanently, couple the saddle member to the boom. In some configurations, the first and second hoppers of the material feed assembly are coupled to the auger housing prior to the coupling to the boom, whereas in other configurations, the hoppers are coupled after the auger housing has been attached to the boom.

To operate the adjustable auger assembly, the user can activate the winch to rotate in a first direction or in a second direction. Depending on the direction of rotation, the auger will either be raised or lowered relative to the boom. This allows for the proper position of the auger relative to the boom for the desired operation. It will be understood that the raising and lowering of the adjustable auger assembly can be accomplished while the auger motor and the hopper motors are rotating and delivering material through the auger. That is, the movement of the auger relative to the boom can be accomplished independently of the operation of the auger and of the hoppers.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An adjustable auger assembly for a trencher, the trencher having a boom having a rotating set of teeth that can rotate about the boom, the adjustable auger assembly comprising:
   an auger housing having a central auger tube having a first end and a discharge end opposite the first end, with an auger shaft positioned therewithin, the auger shaft being rotatable relative to the central auger tube, and at least one material inlet positioned one of at the first end and between the first end and the discharge end; and
   a position attachment assembly having a first component member structurally configured to be coupled to the boom trencher, and a second component member coupled to the auger housing, with the first component member being slidably positionable relative to the second component member, to, in turn, adjust the position of the auger housing relative to the trencher, with the discharge end being slidably positionable along the boom so that the discharge end is slidably positionable along the boom.

2. The adjustable auger assembly of claim 1 wherein the position that is adjustable is a vertical position of the auger housing relative to the trencher.

3. The adjustable auger assembly of claim 2 wherein the first component member comprises a saddle member, the saddle member having opposing side walls defining a channel, with the second component comprising a beam member having a central body slidably positionable within the saddle member.

4. The adjustable auger assembly of claim 3 wherein at least one side wall includes a structure, with the beam member having a corresponding structure, to provide alignment during slidable engagement.

5. The adjustable auger assembly of claim 4 wherein the at least one side wall includes a plurality of guide pins, and the beam member having a corresponding protrusion to slidably interface with the guide pins, so as to provide alignment during slidable engagement therebetween.

6. The adjustable auger assembly of claim 4 wherein each side wall includes a plurality of guide pins, the beam member having a corresponding protrusion on either side thereof to slidably interface with the guide pins, so as to provide alignment during slidable engagement therebetween.

7. The adjustable auger assembly of claim 1 wherein the position adjustment assembly further includes an adjustment member configured to slidably urge or maintain the second component member in a desired position relative to the first component member.

8. The adjustable auger assembly of claim 7 wherein the adjustment member comprises a winch member mounted on one of the second component member and the first component member and a cable that is coupled to the winch at one end and fixedly coupled to the other of the second component member and the first component member, or a structure fixedly coupled thereto.

9. The adjustable auger assembly of claim 8 wherein the winch is mounted on the first component member and the cable includes a second end coupled to the auger frame.

10. The adjustable auger assembly of claim 9 wherein the winch comprises a dual winch member, having a first cable member and a second cable member, with the second end of both of the first cable member and the second cable member being coupled to the second component member on either side of the winch.

11. The adjustable auger assembly of claim 1 further comprising a material feed assembly having a discharge end that is coupled to the material inlet.

12. The adjustable auger assembly of claim 11 wherein the material feed assembly further comprises a first hopper having a storage container, a hopper auger tube coupled to the first hopper at the bottom end thereof, and a hopper auger shaft augmented by an auger motor, with the hopper auger shaft positioned within the hopper auger tube, to, in turn, direct material through the discharge end and, in turn, into the material inlet.

13. The adjustable auger assembly of claim 12 further comprising a second hopper positioned opposite the first hopper, the second hopper having a storage container, a hopper auger tube coupled to the first hopper at the bottom end thereof, and a hopper auger shaft augmented by an auger motor, with the hopper auger shaft positioned within the hopper auger tube, to, in turn, direct material through the discharge end and, in turn, into the material inlet.

14. The adjustable auger assembly of claim 1 wherein the central auger tube is inwardly angled relative to the boom, to, in turn, allow for a material that extends out of the discharge end to be directed inwardly at the boom and downwardly along the boom.

\* \* \* \* \*